(12) United States Patent
Skogward

(10) Patent No.: US 6,443,024 B1
(45) Date of Patent: Sep. 3, 2002

(54) CONTROL DEVICE

(75) Inventor: Kenneth Skogward, Huskvarna (SE)

(73) Assignee: Kongsberg Automotive AB (SE)

( * ) Notice: Subject to any disclaimer, the term of this patent is extended or adjusted under 35 U.S.C. 154(b) by 0 days.

(21) Appl. No.: 09/720,552

(22) PCT Filed: Jun. 29, 1999

(86) PCT No.: PCT/SE99/01181

§ 371 (c)(1),
(2), (4) Date: Dec. 27, 2000

(87) PCT Pub. No.: WO00/03162

PCT Pub. Date: Jan. 20, 2000

(30) Foreign Application Priority Data

Jun. 29, 1998 (SE) .............................. 9802345-0

(51) Int. Cl.⁷ .............................................. F16H 59/02
(52) U.S. Cl. ................. 74/473.18; 74/473.28; 74/491
(58) Field of Search ................... 74/473.18, 491, 74/525, 516, 518, 473.28

(56) References Cited

U.S. PATENT DOCUMENTS

| 262,519 | A | * | 8/1882 | Walters | 254/105 |
| 2,977,817 | A | * | 4/1961 | Panasewicz | 74/512 |
| 5,415,056 | A | | 5/1995 | Tabata et al. | 74/335 |
| 5,689,996 | A | * | 11/1997 | Ersoy | 74/335 |
| 5,884,529 | A | * | 3/1999 | Meyer | 74/473.18 |

FOREIGN PATENT DOCUMENTS

| DE | 37 34 404 | 4/1989 |
| EP | 0 358 894 | 3/1990 |
| EP | 0 693 391 | 1/1996 |
| EP | 0 756 112 | 1/1997 |

* cited by examiner

Primary Examiner—Allan D. Herrmann
(74) Attorney, Agent, or Firm—Lerner, David, Littenberg, Krumholz & Mentlik, LLP

(57) ABSTRACT

The present invention relates to an operating device with a control lever (1) and an operating console (2), and provided with two pivot axes about which the lever can be alternately pivoted relative to the operating console, for adjustment between a number of operating positions. The operating positions of the control lever about said pivot axes are intended for transmission into a corresponding operating condition of a device to be operated. Said pivot axes are created by four support members (3, 4, 5, 6) for the control lever (1) in the operating console, in pairs defining each one of the pivot axes for the control lever. The support members are biased towards their respective paths (7, 8, 9, 10) defined in the operating device, in which paths the support members, alternately and in pairs, are blocked and operable, respectively, to allow control movement of the lever.

5 Claims, 8 Drawing Sheets

CONTROL DEVICE

TECHNICAL FIELD

The present invention relates to an operating device comprising a control lever and an operating console and being provided with at least two pivot axes around which the lever may alternatively be pivoted relative to the operating console, for adjustment between a number of operating positions, said operating positions of the control lever about said pivot axes being intended for transmission into a corresponding operating condition of a device to be operated.

STATE OF THE ART

In operating devices of a common type, such as gear selection controls for automotive vehicles, a gear selector lever included in the arrangement can be set to a multitude of different positions, each determining a certain operating state of the device, for example a vehicle transmission, to be operated. Hereby, the operating position of the lever is transmitted to the device to be operated by means of a transmission member, e.g. in the form of a wire, a linkage, hydraulics, or electrical signals. For a certain type of operation it may be desirable that a first transmission member is not activated, but that the position of the control lever is transmitted by a second transmission member. In a conventional operating device, the first transmission member must then be disconnected when the other transmission member is connected, which results in a complicated mechanism.

DISCLOSURE OF INVENTION

The object of the present invention is to provide an operating device that, with only few moving parts, allows alternating activation of different transmission members.

Said object is achieved by means of an operating device according to the present invention, which is characterised in that said pivot axes are formed by four support members for the control lever in the operating console, in pairs defining each one of the pivot axes of the control lever; in that the support members are biased towards their respective paths in the operating device, in which paths the support members, alternately and in pairs, are blocked against a certain movement and operable in a certain movement, respectively, to allow control movement of the lever along a selected path of movement.

BRIEF DESCRIPTION OF DRAWINGS

The invention will be described in greater detail below by way of an embodiment example, with reference to the enclosed drawings, in which:

FIGS. 11 and 12 show the movement pattern during change of mode, while

PREFERRED EMBODIMENTS

The operating device according to the invention, in the illustrated example, consists of a gearshift controller for automotive vehicle automated transmissions, also comprising an integrated function for manual selection of gear ratios. The operating device is adjustable between different operating modes, in the illustrated example an automatic mode and a manual mode, as will be described in further detail below.

Figure 1:
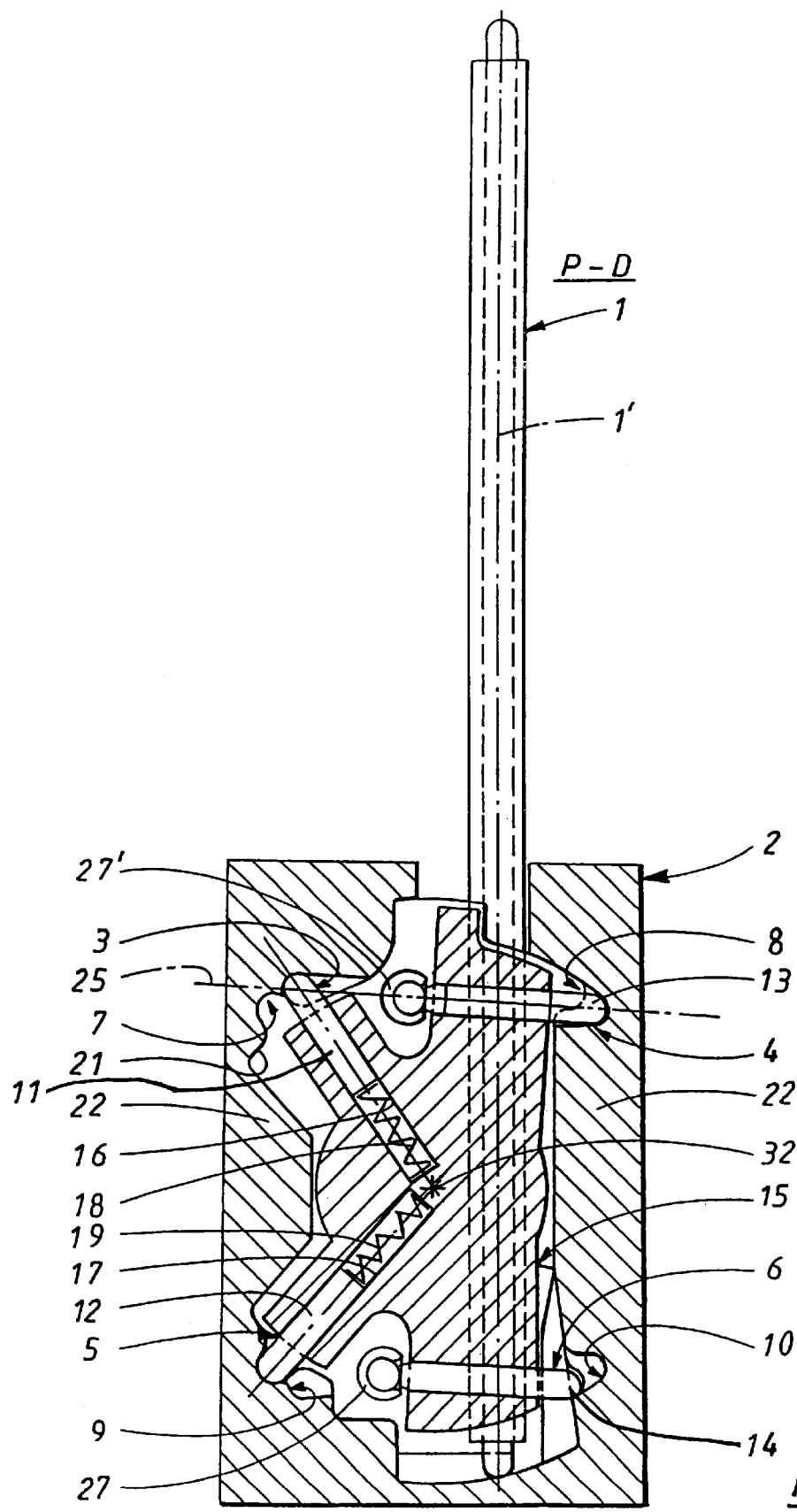
FIG. 1 shows, in cross section, the operating device in a first mode of operation.
Figure 2:
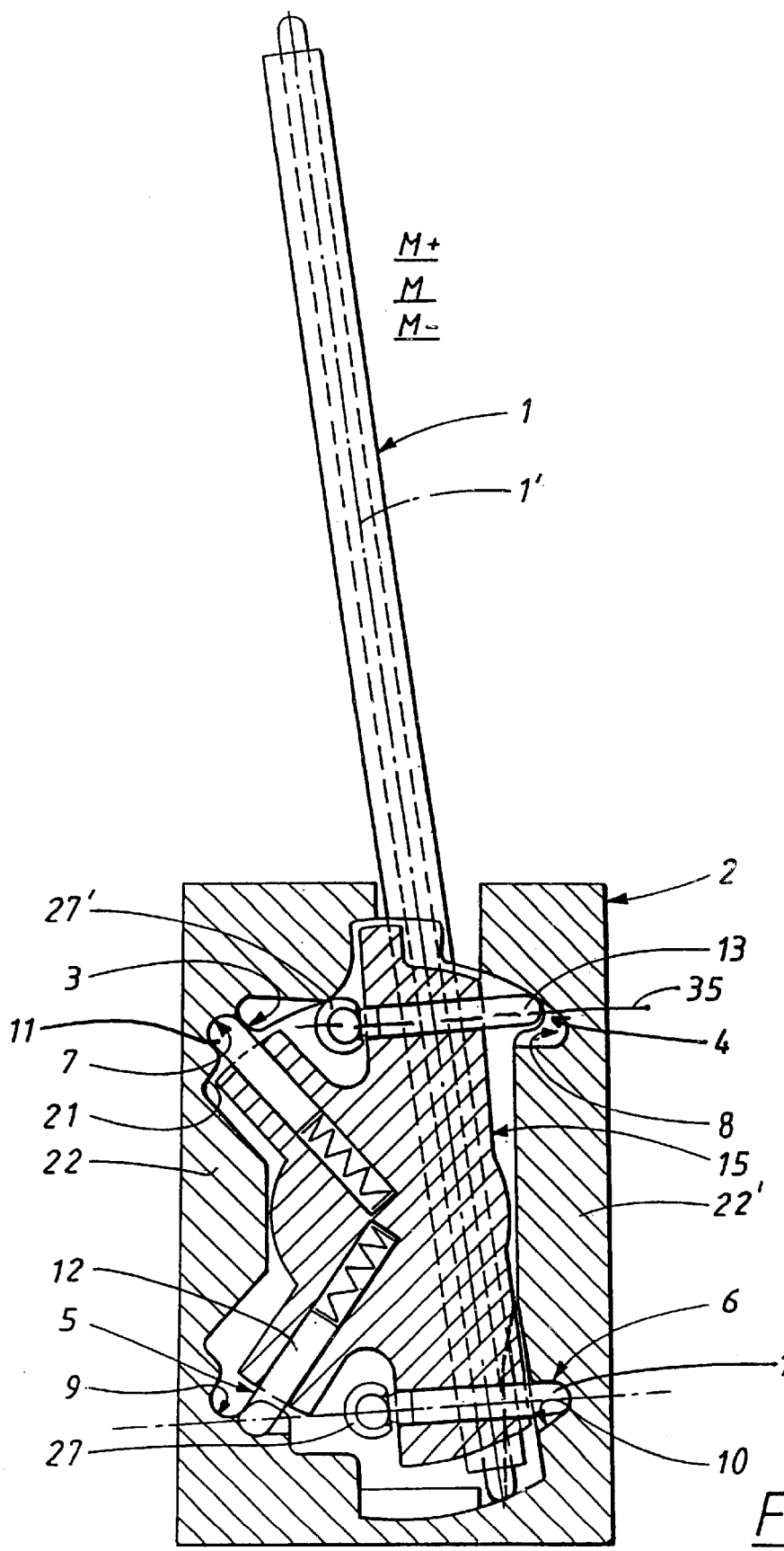
FIG. 2 shows, in the same cross section, the operating device in a second mode of operation.

The operating device, as can be gathered from FIGS. 1 and 2, consists of a control lever 1 and an operating console 2, in which the control lever is pivoted for assuming various operating positions, to be transmitted into various operating conditions of the device to be operated, in the illustrated embodiment various gear ratios of the automatic transmission. The control lever 1 is position controlled in the operating console by means of four movable support members 3–6, connected to the control lever and, in co-operation with four fixed support and guide members 7–10 in the operating console, creating four movable points of support defining the movement pattern and the positions of the lever 1.

The support members 3–6, movable together with the control lever 1, are in the illustrated example created by pins 11–14, arranged in a carrier 15, fixedly arranged on the lever 1. At least one, in the illustrated example two, of the pins 11, 12 are linearly movable in a bore, 16, 17, respectively, in the carrier 15 and are spring-loaded by each one spring, 18, 19, respectively, so as to be biased in an outwards direction relative to the carrier, towards guide members, 7 and 9 respectively, in the operating console. In the example, the two other pins 13, 14, are fixedly attached to the carrier 15, but they also obtain, indirectly, an elastically biased support in the operating console 2, via the carrier 15, from the spring-loaded pins. The control lever 1 is thus, via the carrier 15, constricted securely and without play in the operating console and can be adjusted between various positions, in a manner to be described in further detail below.

Figure 3:
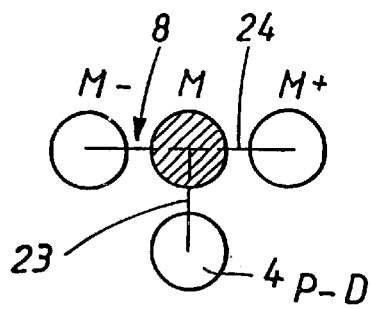
FIGS. 3–8 show various operating positions of the support members comprised in the operating device, partly in the form of schematic views and partly in the form of sectional views.
Figure 5:
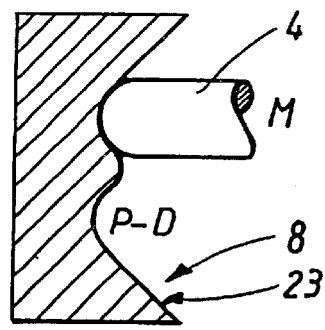
Figure 4:
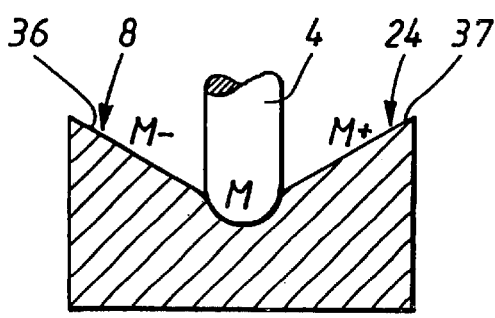

Each one of the fixed, upper guide members 7, 8, is designed as a guide path in the form of a T-shaped path having predetermined positions for the movable, upper support members 3,4. The paths are arranged in the inside wall 21 of each one of the side portions 22, 22' of the operating console 2. The extension in principle of the right hand side (see FIG. 1), upper path is schematically shown in FIG. 3, showing also the corresponding movable support member 4 in various alternative positions. The functional shape of the path can be gathered from the two cross sections shown in FIGS. 4 and 5 and is achieved by a selected profiling of the path. The path runs like a T, having a vertically extending guide path 23 and a horizontally or longitudinally extending guide path 24. The cross sections are taken along the respective guide paths 23, 24. When the movable support member 4 is at the end of the guide path 23, i.e. in the position P–D, which is a stable operating position due to the profiling of the path, i.e. in the position shown in FIG. 1, the support member 4 is blocked against horizontal movements, i.e. at right angles to the plane of the paper in FIG. 1, but is allowed, however, a pivoting motion relative to the two fixed guide members 7, 8. The illustrated guide member 8 in the side portion 22' has the shape of an upright T, whereas the guide member 7 in the opposite side portion 22 has the form of a reversed T, i.e. inverted around the line 24 of FIG. 3, see also FIGS. 10–13. In this way two opposing points of support are created, defining a first pivot axis 25, whereby pivoting motions of the control lever 1 are allowed, perpendicular to the plane of the paper in FIG. 1, representing the first mode of operation, which is enabled by the design of the other two fixed guide members 9, 10, which will now be described. The guide path 24, through its profiling, has three operating positions M, M+ and M–, active in the second operating mode, which will be described in further detail below.

Figure 6:
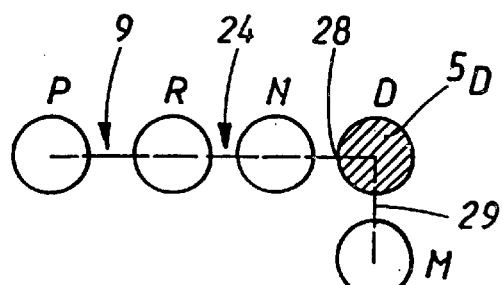
Figure 8:
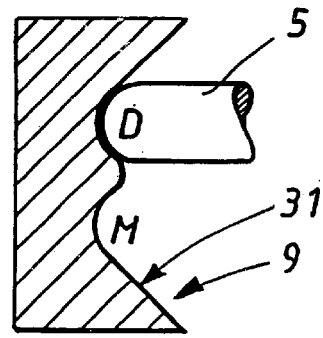
Figure 7:
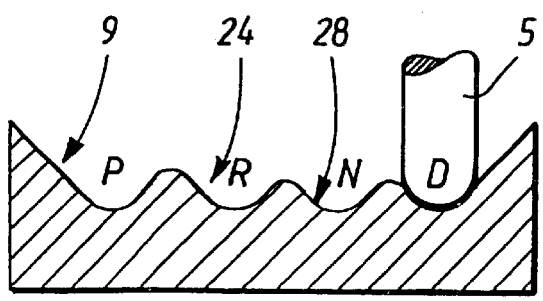
Figure 9:
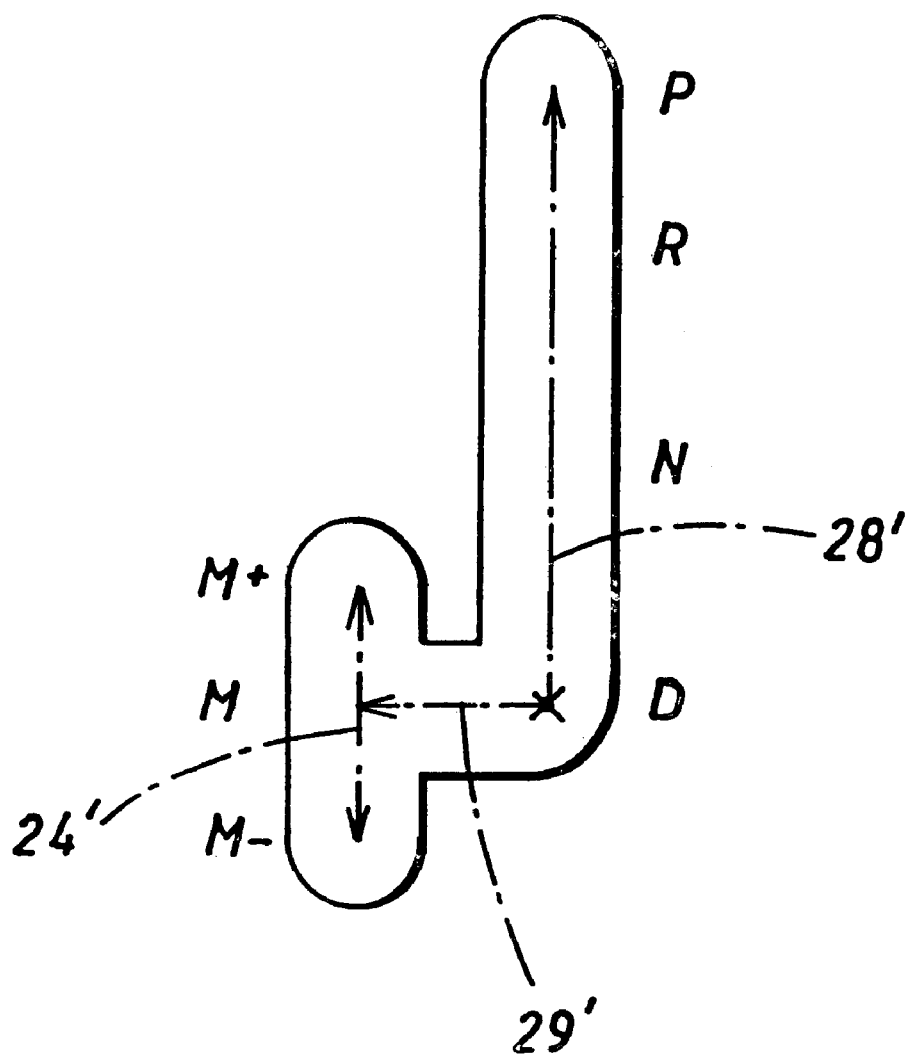
FIG. 9 shows an example of movement paths for the control lever comprised in the operating device.

FIGS. 6–8 show the extension and the functional design of one of the lower, fixed guide members 9 in the side portion 22 of the operating console 2. This member exhibits a first guide path 28 for the movable support member 5. Said path is arranged to allow a displacement of the support member 5 perpendicularly to the plane of the paper in FIG. 1, whilst overcoming a certain resistance through a profiling of the path, so as to define a number of distinct, stable operating positions. In co-operation with the pressure force from the spring 19, in the direction of the pin 12 towards the guide member 9, a certain resistance in the lever 1 is created against movement between the operating positions. In the case of an automatic transmission, the operating positions are in turn represented by for example the parking P, reverse R, neutral N and drive D positions, thus creating the first mode of operation. These positions are illustrated by a first path of movement 28', shown as an example of movement paths for the control lever 1 in FIG. 9, which paths may be physically represented by grooves in the operating console 2. Because of the upper support members 3, 4, in the position according to FIG. 1, being completely blocked against transversal, horizontal movement, and the lower support members 5, 6 being allowed to be displaced transversely, horizontally, perpendicularly to the plane of the paper, the control lever 1 can be pivoted about the pivot axis 25. For transmission of the operating positions of the control lever 1 in its first mode of operation, a movement sensing device, comprising a transmission member 27, is included, connected so as to sense the movements of the lever in the first mode and to that end being connected at the lever carrier 15, at a distance from the first pivot axle 25. The transmission member 27 may for example be a mechanical wire, or linkage arms extending transversely to the plane of the paper in FIG. 1 and being subjected to a reciprocal longitudinal displacement when pivoting the lever 1 about the axis 25. The transmission member 27 could also consist of a hydraulic cylinder, an electrical position sensor, or the like.

Figure 10:
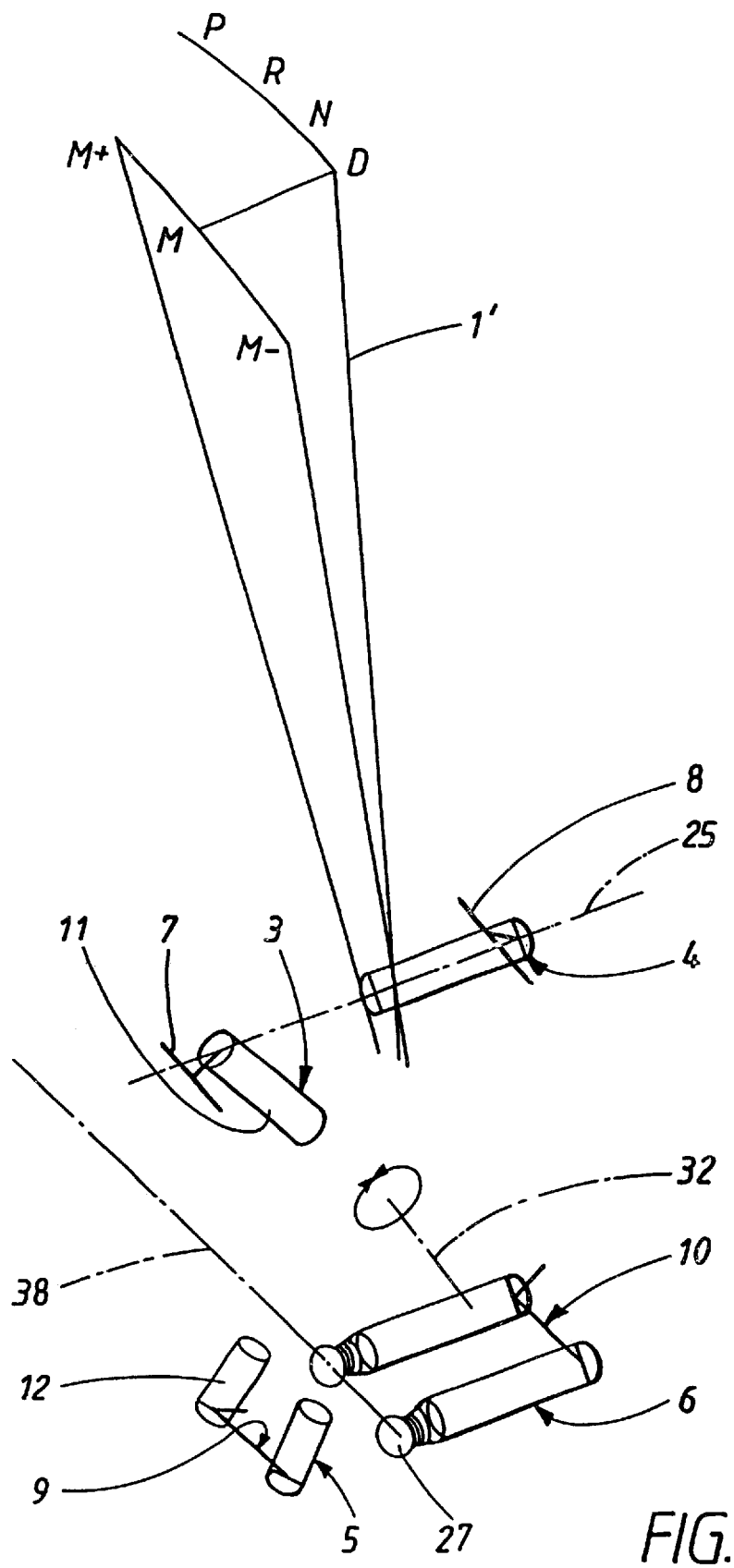
FIG. 10 shows, schematically, the movement pattern of the operating device in the first mode of operation.
Figure 11:
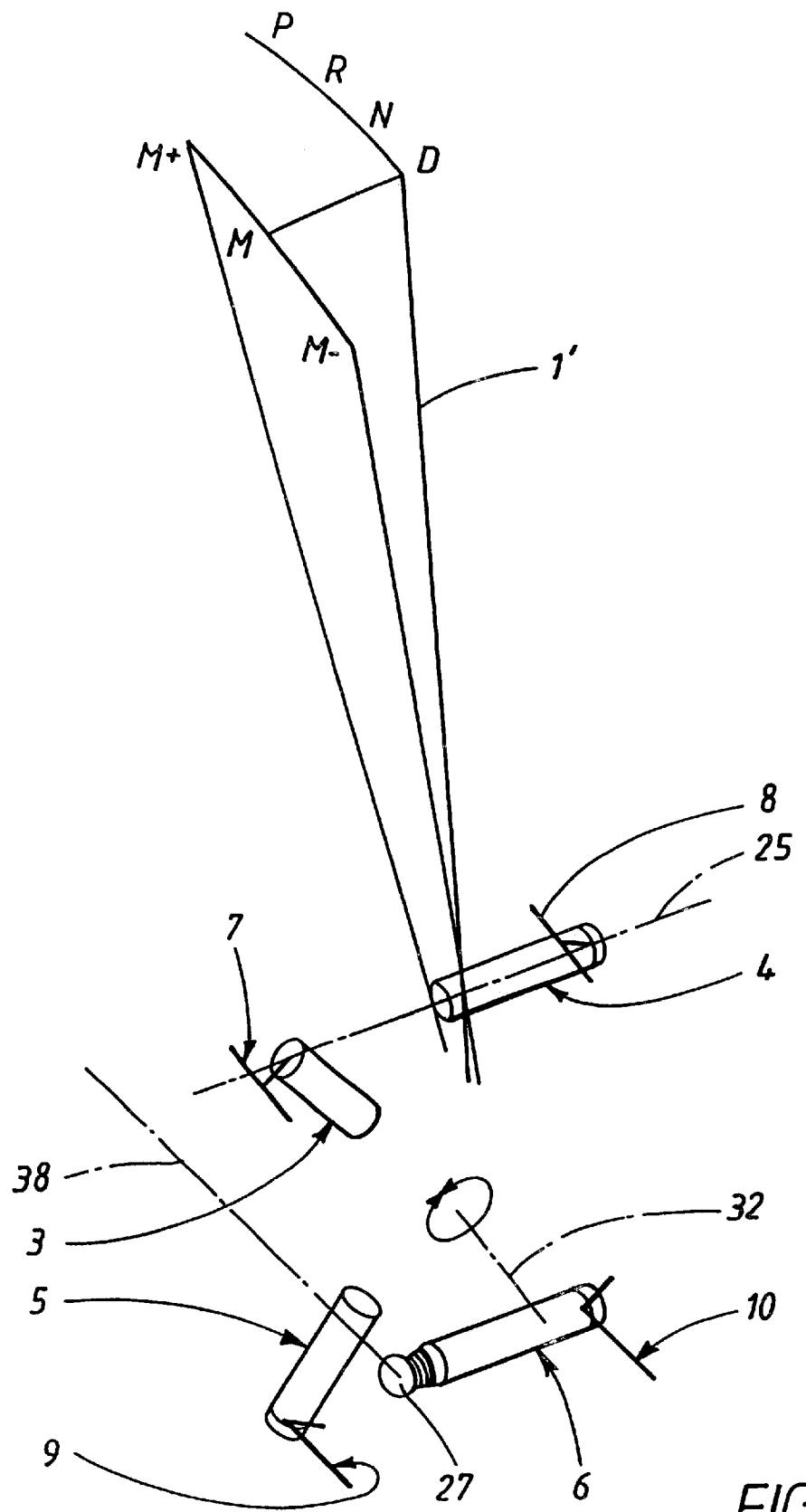

In the foregoing, the first mode of operation has been described, in the illustrated example corresponding to a pure automatic transmission mode, where the vehicle, in the drive position D, will be switching automatically between different gear ratios. The movement pattern of the complete operating device is schematically illustrated in FIG. 10, showing the movable support members 3–6, which the lower ones are shown in their end positions. Further, the fixed guide members 7–10, the pivot axle 25 and the longitudinal axis 1' of the lever 1, are illustrated schematically. The end positions of the transmission member 27 are also shown, with the adherent wire 38, which is displaced longitudinally when the lever is pivoted about the upper pivot axis 25. For an alternative gear changing function with manual selection of gear ratios, the operating device according to the invention is provided with a second, manual operating mode that is entered by moving the control lever through a mode change path 29' at right angles to the first movement path 28', in FIG. 9, more particularly in the plane of the paper in FIG. 1. This is possible by allowing all four movable or displaceable support members 3–6 to be included in the lever movement from position D to position M, see FIGS. 2,9 and FIGS. 11, 12. This in turn is possible through the design of the fixed guide members 7–10. The upper guide members 7, 8 will allow, due to their T shape according to FIG. 3, a displacement of the support members 3, 4 from position P–D to position M, by allowing the support members 3, 4 to move along the guide path 23. Simultaneously, the lower control members 5–6 are allowed to move from position D to position M, see FIG. 4, along the other guide path 29, which is transversal in relation to the first guide path 29 of the fixed guide members 9, 10. In the illustrated example, the guide path 29 in the guide member 9, i.e. at the left of FIG. 1, extends in a downward direction as shown in FIG. 6, whilst the guide path 29 at the right is directed in the opposite direction, i.e. upwards, as can be seen from FIGS. 10–13. During this mode change movement, the control lever 1 is pivoted around a third geometric axis, see FIGS. 1, 2, 10 and 11, said axis thus defining the pivot center for the lever 1 and the carrier 15 during their mode change movement. The third axis 32 extends perpendicularly to the plane of the paper in FIGS. 1 and 2 and is, in the illustrated example, located at the intersection between the longitudinal axes of the spring biased support members 3, 5. The axis 32 is created by the curved shape of the guide members 8, 10.

Figure 12:
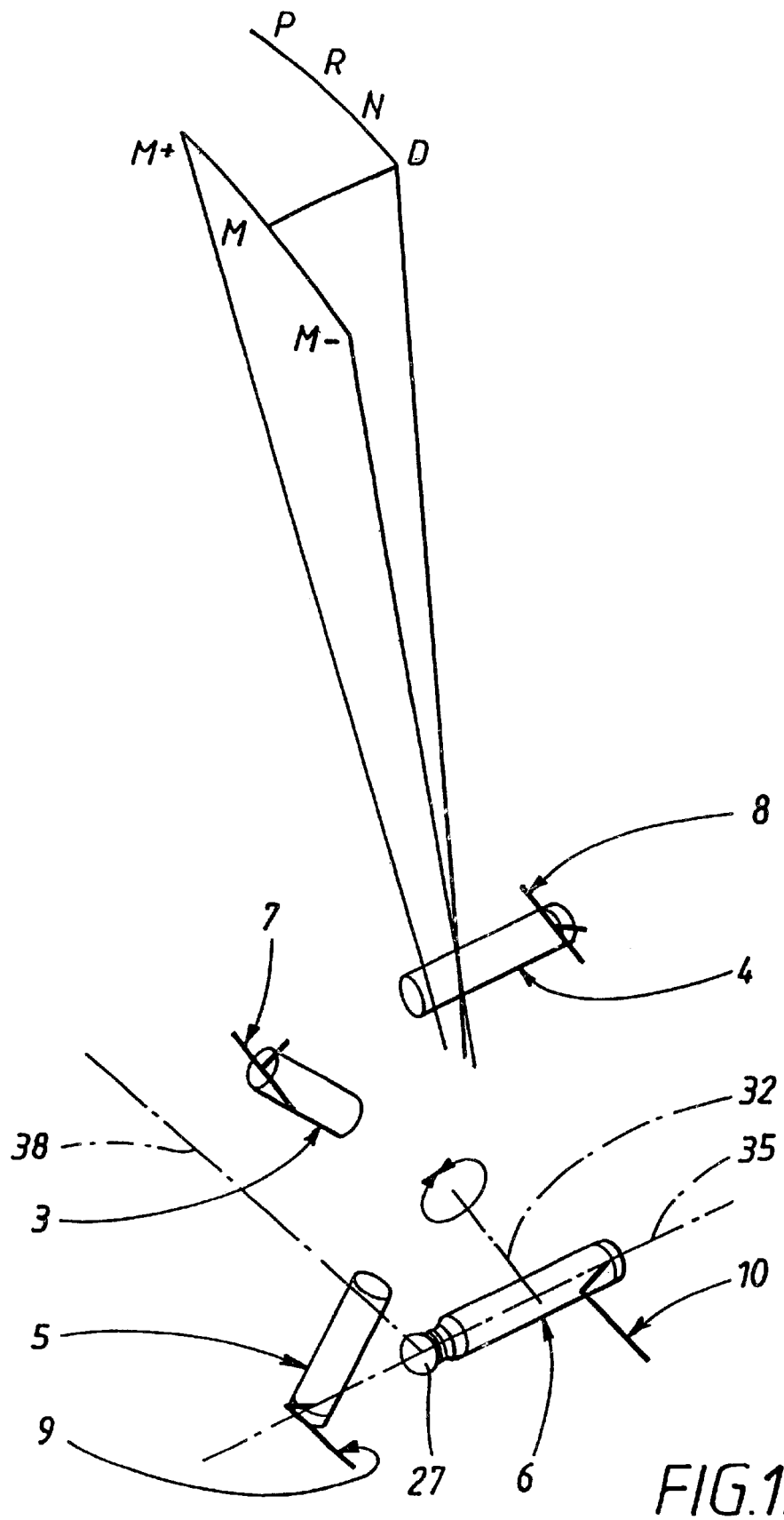
Figure 13:
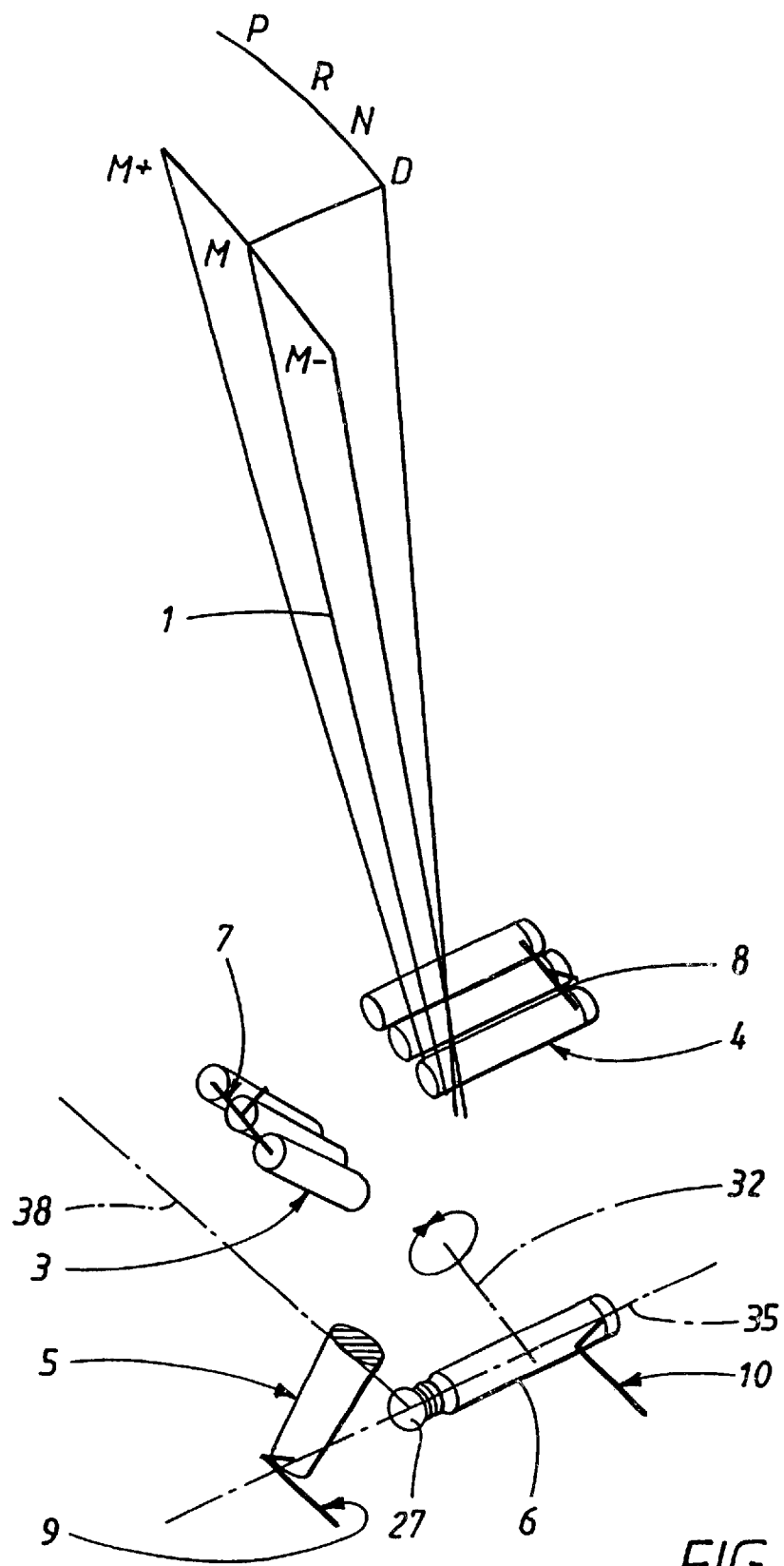
FIG. 13 shows the movement pattern in the second mode of operation.

With the support members 3–6 in their respective M positions according to FIGS. 12 and 13, the control lever I is allowed to be moved forwards and backwards, respectively, in a generally transversal direction to the plane of the paper in FIG. 2. By setting the control lever to its M position, a change of axis occurs, from the pivot axis 25 to a second pivot axis 35, the extension of which is defined by the support points for the lower support members 5, 6 in their respective M positions. The upper, movable support members 3, 4 will now pass from their translationally blocked pivot position to a translationally movable position along the guide path. Simultaneously, the lower support members 5, 6 have passed from a translationally movable position to a translationally blocked pivot position, thus defining the pivot axis 35. The control lever will now be able to pivot around the pivot axis 35 in a relatively short pivoting motion, see FIG. 9. This is because the movement is limited by the length of the guide path 24, see FIGS. 3 and 4, allowing a movement of the upper movable support members 3, 4 from a neutral position M to a first end position M+ and a second end position M–, respectively. Due to the spring bias on the support member 4 by the compression spring 18, and a selected profiling of the guide path 24, with a bowl-shaped neutral position M and upwards-sloping portions 36, 37 from the neutral position towards the end positions M+ and M–, the end positions are not stable, but self-centring occurs to the neutral position M from the end positions when releasing the operating force on the control lever, see FIG. 4.

As the position sensing member 27 is located on (or close to) the lower pivot axis 35 and is preferably designed as an articulated mounting for e.g. the wire, said member will remain inactive and will not perform any translation movement during the second mode of operation. Instead, a second movement detecting member 27 will be activated, as suggested in FIGS. 1 and 2, which may be of the same structure and functionality as the first movement detecting member 27 and may be connected to a second wire for transmission of a translation movement to the vehicle transmission, for operating same.

The operating movements of the control lever during the second mode of operation are, however, preferably transmitted to the automatic transmission via other kinds of transmission devices, for example consisting of electrical sensors, detecting the position of the control lever and electrically transmitting it to electrical operating devices at the automatic transmission for shifting same between various gear ratios. Examples of electrical sensors are microswitches, which may be located on the inside of the operating console, partly for determining that the second operation mode is entered, and partly for sensing the operating positions of the lever during this mode. In an advantageous example, the positions are sensed by contact with some portion of the carriage 15. Examples of such switches and their function can be studied by reference to the International Patent Application No WO 97/01455, the structure and function of which can be applied in full to the present invention.

The invention is not limited to the embodiment example described above and depicted in the drawings, but can be varied within the frame of the appended patent claims. For example, the various axes may assume other angular positions in relation to each other. Further, the support members and the control members might be given another design, as might the carrier and the blocking mechanisms shown. Other gear ratio positions than the positions shown can of course be applied.

For example, the movement path 28' may be stepped, in which case the guide path 28 is also made with steps. Hereby, the lever 1 with the carrier 15 is allowed to pivot around the third pivot axis 32, which will thereby be angled somewhat for each step. The steps will define blocking positions that may replace the blocking mechanism suggested at the lower end of the lever 1 and being adjusted by means of an operating key at the top end of the lever via a rod inside the lever. In principle, the function according to the invention can be accomplished in an embodiment where the pins are arranged in the operating console 2 and the paths are provided in the carrier 15, thus being movable together with the lever 1.

What is claimed is:

1. An operating device, comprising a control lever and an operating console and being provided with at least two pivot axes around which the lever may alternately be pivoted relative to the operating console, for adjustment between a number of operating positions, said operating positions of the control lever about said pivot axes being intended for transmission into a corresponding operating condition of a device to be operated, said pivot axes being formed by four support members for the control lever in the operating console, pairs of said support members defining the pivot axes for the control lever, the support members being biased towards their respective paths defined in the operating device, in which paths the support members, alternately and in pairs, are blocked against a certain movement and operable in a certain movement, to allow control movement of the lever along a selected path of movement.

2. The operating device according to claim 1, further comprising first and second movement sensing members, said first and second movement sensing members being arranged for alternative switching between active and passive states through said change between the pivot axes.

3. The operating device according to claim 2, wherein at least one of said movement-sensing members is located adjacent to one of said two pivot axes, and remotely from the other of said pivot axes.

4. The operating device according to claim 1, wherein said control lever is pivotable about at least a third pivot axis in relation to the operating console.

5. The operating device according to claim 4, wherein said lever is affixed to a carrier carrying the four support members, and the operating console has at least two walls facing the carrier.

* * * * *

UNITED STATES PATENT AND TRADEMARK OFFICE
CERTIFICATE OF CORRECTION

PATENT NO. : 6,443,024 B1  Page 1 of 1
DATED : September 3, 2002
INVENTOR(S) : Kenneth Skogward It is certified that error appears in the above-identified patent and that said Letters Patent is hereby corrected as shown below:

Column 4,
Line 60, "27" should read -- 27' --

Signed and Sealed this

Eleventh Day of February, 2003

JAMES E. ROGAN
*Director of the United States Patent and Trademark Office*